United States Patent Office 3,322,832
Patented May 30, 1967

3,322,832
ACRYLOYLPHENOLS AND A METHOD FOR THEIR PREPARATION
Edward J. Cragoe, Jr., Lansdale, Pa., assignor to Merck & Co., Inc., Rahway, N.J., a corporation of New Jersey
No Drawing. Filed Apr. 20, 1964, Ser. No. 361,932
17 Claims. (Cl. 260—592)

This invention relates to a new class of acryloylphenols, compounds having diuretic, natriuretic and chloruretic properties and which are thus useful in the treatment of conditions resulting from an excessively high retention of electrolyte or fluid in the body.

The products of the invention are compounds having the following structure:

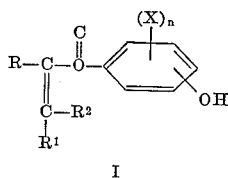

I wherein R is a member selected from the group consisting of lower alkyl, e.g., methyl, ethyl, propyl, butyl, isopropyl, isobutyl, pentyl, etc., halo-lower alkyl, e.g., trihalomethyl-lower alkyl, such as 2,2,2-trifluoroethyl, 1-(trifluoromethyl)ethyl, etc., cycloalkyl, e.g., cycloalkyl containing 3–6 nuclear carbon atoms, such as cyclobutyl, cyclopentyl, cyclohexyl, etc.,

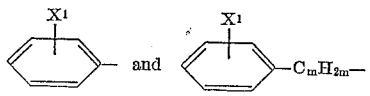

wherein $X^1$, in each occurrence, is a member selected from the group consisting of hydrogen, halogen and lower alkyl and $m$ is an integer having a value of 1–5, $R^1$ and $R^2$ each represents a member selected from the group consisting of hydrogen and lower alkyl, e.g., methyl, ethyl, isopropyl, etc., X represents one or more similar or dissimilar radicals selected from the group consisting of halogen, lower alkyl and, when substituted on adjacent carbon atoms of the benzene nucleus two X radicals may be combined to form an hydrocarbylene chain (i.e., a divalent organic radical composed solely of carbon and hydrogen) containing from 3–4 carbon atoms between their points of attachment, e.g., 1,3-butadienylene (i.e., —CH=CH—CH=CH—), tetramethylene (i.e., —CH$_2$—CH$_2$—CH$_2$—CH$_2$—)

etc. and $n$ is an integer having a value of 1–4.

A perferred aspect of the invention relates to an acryloylphenol of the formula:

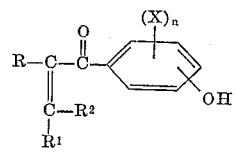

wherein R is a member selected from the group consisting of lower alkyl, trihalomethyl-lower alkyl and cycloalkyl, $R^1$ and $R^2$ each represents a member selected from the group consisting of hydrogen and lower alkyl, X represents one or more similar or dissimilar radicals selected from the group consisting of halogen and lower alkyl and $n$ is an integer having a value of 1–4. The above class of compounds exhibits particularly good diuretic activity and represents a preferred subgroup of compounds within the scope of this invention.

This invention also relates to the acid addition salts of the instant acryloylphenols, which salts are prepared by the reaction of the said phenols with a base having a non-toxic pharmacologically acceptable cation.

The acryloylphenols of the invention, wherein $R^1$ and $R^2$ in the above planar Formula I are hydrogen, are conveniently synthesized from the corresponding Mannich compounds (III or IV infra) which are prepared by the reaction of an alkanoylphenol (II) with formaldehyde or paraformaldehyde and the acid addition salt of a secondary amine, as for example, the acid addition salt of a di-lower-alkylamine, piperidine or morpholine. Certain of the acid addition salts of the Mannich amines (III) thus formed may be converted directly to their corresponding acryloylphenol products (I) by decomposition as, for example, by heating the said Mannich salts at temperatures above room temperature. This reaction is most advantageously conducted in the presence of a solvent of high dielectric constant, e.g., dimethylformamide. Usually, however, the salt of the Mannich amine (III) is treated with a weak base, such as sodium bicarbonate, to obtain the corresponding Mannich base (IV) which is then decomposed to the desired acryloylphenol compound (I). Some of the mannich bases decompose at ambient temperatures but generally decomposition is effected by heating. I have also found that it is sometimes advantageous to treat the Mannich base (IV) with a suitable quaternizing agent as, for example, with an alkyl halide, to produce the corresponding quaternary ammonium salt (V) which, in turn, is treated with a base, e.g., an aqueous solution of sodium bicarbonate. Following the decomposition which thus occurs, the resulting product is treated with a suitable acid, e.g., hydrochloric acid, to yield the desired acryloylphenol (I). The following equation illustrates these processes:

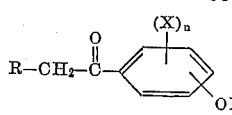 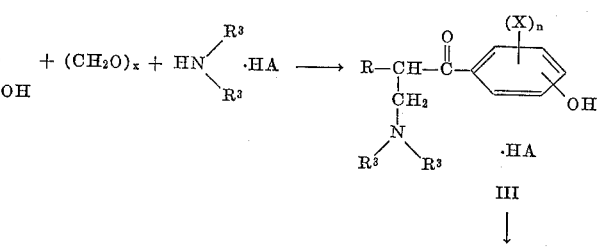

II            III

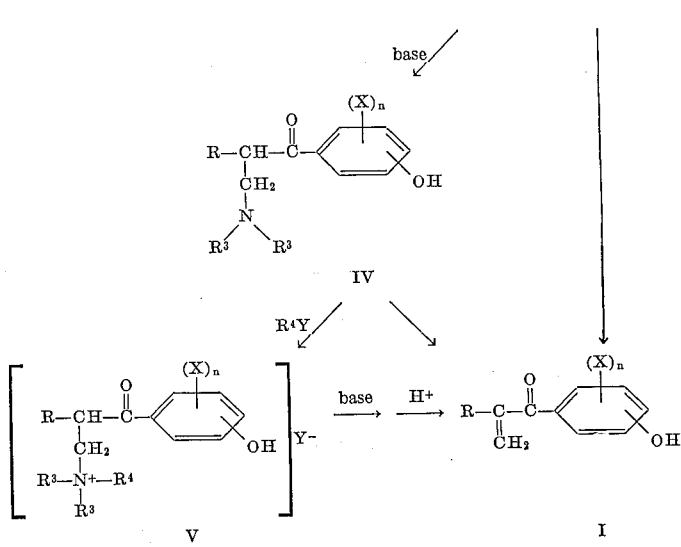

wherein the radicals R, X and $n$ are as defined above, $R^4Y$ represents a hydrocarbyl halide, i.e., the halide derivative of a monovalent organic radical composed solely of carbon and hydrogen, e.g., methyl bromide, methyl iodide, etc., $R^4$ represents a hydrocarbyl radical, e.g., lower alkyl, etc., $Y^-$ represents the anion derived from a hydrocarbyl halide, e.g., a bromide ion, an iodine atom, etc.,

represents a secondary amine, e.g., an amine selected from the group consisting of di-lower-alkylamine, piperidine and morpholine, HA is an organic or inorganic acid capable of forming salts with amines, e.g., hydrochloric acid, etc., and $x$ is the integer 1 or a number greater than 1.

Another method of preparing the acryloylphenols (I) of the invention, and one which is particularly suitable for preparing those products wherein one or both of the $R^1$ and $R^2$ moieties represents lower alkyl, comprises treating an alkanoylphenol (having the Formula VI infra) with a suitable halogenating agent, for example, chlorine, bromine, iodine monochloride, etc.; followed by the reaction of the (2-haloalkanoyl)phenol (VII) thus produced with a dehydrohalogenating agent. Dehydrohalogenating agents which we have found to be suitable in the process include, for example, tertiary amines, metal halides, alkali metal acetates and alkali metal carbonates, etc. Specifically, triethylamine, anhydrous lithium chloride, lithium bromide, silver acetate, potassium acetate, silver fluoride and potassium carbonate have been found to be particularly effective dehydrohalogenating reagents. The halogenation and dehydrohalogenation reactions are illustrated by the following equations:

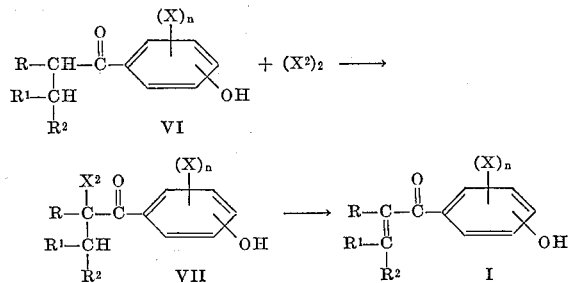

wherein the radicals R, $R^1$, $R^2$, X and $n$ are as defined above, $X^2$ represents a halogen atom, for example, a chlorine atom, a bromine atom, an iodine atom, etc. and $(X^2)_2$ represents a halogenating agent as, for example, chlorine, bromine, iodine monochloride, etc. In general, the dehydrohalogenation reaction may be carried out in any inert solvent in which the (2-haloalkanoyl)phenol and dehydrohalogenation reactants are reasonably soluble; for example, dimethylformamide has proved to be a particularly suitable medium in which to conduct the reaction, especially when lithium chloride or lithium bromide is the dehydrohalogenating reagent employed. The reaction temperature and the reaction time are not particularly critical aspects of the process and one skilled in the art may, in general, vary the temperature so as to obtain the desired rate of reaction.

In those instances wherein R represents a radical containing at least one hydrogen atom on the alpha-carbon as, for example, where R is a $R^3R^4CH-$ group, wherein $R^3$ and $R^4$ each represents a lower alkyl, halo-lower alkyl, cycloalkyl or aralkyl radical, the reaction may take an alternate course resulting in the formation of an isomeric product IA:

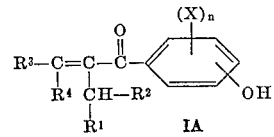

or in an isomeric mixture of products (i.e., I and IA).

Various methods may be used to prepare the alkanoylphenol reactants described supra as compounds II and VI. One method comprises the Friedel-Crafts reaction of an appropriate nuclear substituted or nuclear unsubstituted phenol ether, such as an anisole or phenetole, with an alkanoyl halide in the presence of a metallic halide; followed by hydrolysis of the etherified alkanophenone intermediate thus produced to the desired alkanoylphenol. Suitable metallic halides which may be used in the process include, for example, anhydrous aluminum chloride, etc. Although this method may be used to prepare either the 2 or the 4 substituted alkanoylphenol reactant, it frequently occurs that the Friedel-Crafts reaction produces a mixture of the 2- and the 4-isomers of the phenol ether reactant; this is particularly so when the phenol ether employed as the starting material contains a substituent in the 3-position of the benzene nucleus, e.g., 3-chloroanisole, 3-methylanisole, etc. Usually when such a mixture is obtained no attempt is made to separate the isomeric alkoxyalkanophenones; instead, the mixture is hydrolyzed to produce the corresponding alkanoylphenols and the isomeric alkanoylphenol compounds thus produced are then readily separated by distillation.

The alkanoylphenol starting materials can also be prepared by the Fries rearrangement, which comprises treating a phenol with an alkanoyl halide to produce the corresponding phenol ester; followed by the heating of the said ester with aluminum chloride to effect a nuclear rearrangement which produces the desired substituted alkanoylphenol. This method of preparation is most suitable for preparing the 2-alkanoylphenol reactants of the invention but those skilled in the art will readily perceive that the Fries method of rearrangement may also be used to prepare the 4-alkanoylphenol isomer under the appropriate conditions. For example, a phenol containing a nuclear substituent in the 2- and 6-positions as, for example, a 2,6-dichlorophenol, may be reacted with an alkanoyl halide to produce the corresponding alkanoic acid ester of the phenol and the said ester may then be converted to the desired 4-alkanoylphenol compound by heating in the presence of aluminum chloride.

Still another method for preparing the alkanoylphenol starting materials comprises the reaction of a Grignard reagent selected from the group consisting of:

(1) 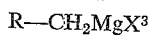
$$R-CH_2MgX^3$$

and (2) 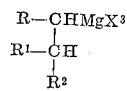

wherein the radicals R, $R^1$ and $R^2$ are as defined above and $X^3$ represents a halogen atom, e.g., chlorine, bromine, etc., with an appropriate formyl substituted phenol ether of the formula:

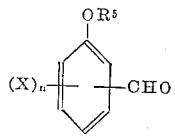

wherein X and $n$ are as defined above and $R^5$ is lower alkyl, such as methyl, ethyl, etc. The alkoxy substituted benzyl alcohol intermediate thus produced is then oxidized to the corresponding ketone derivative and the ether group cleaved by conventional means to produce the desired alkanoylphenol. Oxidizing agents suitable for use in the process include, for example, sodium dichromate dihydrate, etc. Although the Grignard method may be used to prepare all of the isomeric alkanoylphenol reactants, i.e., the 2-, 3- and 4-alkanoylphenols, this method of preparation is a most convenient route for the preparation of the 3-alkanoylphenol isomer. For example, a 3-formylanisole will react with the appropriate Grignard reagent, (1) or (2) supra, to produce the corresponding 3-methoxy substituted benzyl alcohol and the said alcohol is then oxidized to the ketone derivative and the methyl ether group hydrolyzed to produce the desired alkanoylphenol compound.

A preferred method for preparing the 3-alkanoyl substituted phenol starting materials (II or VI) consists in first nitrating an appropriate nuclear substituted or nuclear unsubstituted alkanophenone by conventional means as, for example, with fuming nitric acid, to produce the corresponding 3-nitroalkanophenone intermediate; reducing the said nitro derivative to its amine counterpart and converting the amine to the desired 3-alkanoylphenol derivative.

The acryloylphenol products of the invention are generally obtained as crystalline solids which may be purified by recrystallization from a suitable solvent such as hexane or a mixture of hexane and benzene.

Pharmacological studies of the acryloylphenols of this invention demonstrate that they are effective diuretic and saluretic agents and that they are thus useful in the treatment of conditions resulting from an excessively high concentration of electrolyte in the body, as in the treatment of edematous conditions resulting, for example, from congestive heart failure.

The following examples illustrate the method of preparing the acryloylphenols of the invention. However, the examples are exemplary only and are not to be construed as limiting the invention thereto. One skilled in the art will readily perceive that, by substituting the appropriate starting materials for those employed in the examples, all of the acryloylphenols falling within the scope of generic Formula I supra may be prepared.

*Example 1.—3-chloro-4-(2-methylenebutyryl)phenol*

Step A—3-chloroanisole. — A three-liter, four-necked flask is fitted with a mechanical stirrer, reflux condenser, thermometer and two graduated dropping funnels. The flask is charged with 10 N sodium hydroxide (200 ml., 2 mole), methanol (400 ml.) and m-chlorophenol (257 g., 2 mole). The flask is fitted with a steam bath, the stirrer is started and the steam regulated so that a gentle reflux is maintained throughout the reaction period. The initial reaction temperature is 55–60° C.; at the end it is 75–80° C.

One dropping funnel is charged with methyl sulfate (652 ml., 880 g., 6.98 mole) and the other with 10 N sodium hydroxide (500 ml., 5 mole). The two solutions are added simultaneously to the reaction mixture, taking care that the mixture remains alkaline throughout the reaction period. The addition requires 2½ hours.

After refluxing for an additional hour, the mixture is cooled and poured into cold water (two liters). The upper, organic phase, is separated in a separatory funnel and the aqueous phase thrice extracted with 400 ml. portions of ether. The combined ether and organic phases are dried over anhydrous sodium sulfate.

The ether is removed by distillation and the residue fractionated at reduced pressure using a still with a 30 inch column. The fraction boiling at 65–67° C./7–8 mm. (78–80° C./15 mm. or 81–83° C./18–20 mm.) is collected. The yield varies from 263 g. (92%) to 281 g. (99%). Gas-liquid chromatograms indicate the material to be quite pure.

Step B—3-chloro-4-butyrylanisole and 2-butyryl-5-chloroanisole.—A two-liter resin flask is fitted with a mechanical stirrer, thermometer, reflux condenser capped with a calcium chloride drying tube and an Erlenmeyer flask attached via Gooch tubing. The apparatus is oven dried and assembled while hot. The system is flushed with dry nitrogen and petroleum ether (750 ml.) (Merck's Benzin, B.P. 30–60° C.) (which had previously been dried overnight over some anhydrous aluminum chloride) is placed in the flask. m-Chloroanisole (213.9 g., 1.5 mole) and butyryl chloride (191.8 g., 1.8 mole) are added and the stirrer started. Anhydrous aluminum chloride (200 g., 1.5 mole) is placed in the Erlenmeyer flask and added, portionwise, to the reaction mixture over 30 minutes.

The reaction mixture gradually changes from a pale yellow color to dark orange. Finally a red oil begins to separate. After the addition is complete, stirring is continued for another two hours. Throughout the entire period of reaction, there is a vigorous evolution of hydrogen chloride. During the reaction, the temperature does not exceed 30° C.

The reaction mixture now consists of two layers. The upper, Benzin layer, is decanted off and discarded. The viscous bottom layer is poured into a mixture of crushed ice (1 kg.) and concentrated hydrochloric acid (450 ml.). After the ice has melted, the oil is separated from the aqueous phase and the latter thrice extracted with 500 ml. portions of ether. The combined organic and ether extracts are washed, first with 150 ml. of 5% hydrochloric acid, then twice with 150 ml. portions of water and finally dried over anhydrous sodium sulfate. The ether is removed by distillation and the residue distilled at reduced pressure using a still with a 30 inch column.

The fraction boiling at 100–110° C./0.1 mm. (122–138° C./1.5–2.9 mm.) is collected. The yield is 298 g. (94%). The product consists of a mixture of 3-chloro-4-butyrylanisole and 2-butyryl-5-chloroanisole in about equal portions. Separation at this stage is difficult to obtain by the usual techniques. However, the corresponding phenols are easily separated and, therefore, the mixture is used in the following step.

*Step C—3-chloro-4-butyrylphenol and 2-butyryl-5-chlorophenol.*—A two-liter resin flask is equipped and assembled as described for the above reaction. n-Heptane (1500 ml.) is dried overnight over anhydrous aluminum chloride and placed in the reaction vessel with the mixture of 3-chloro-4-butyrylanisole and 2-butyrl-5-chloroanisole prepared in Step B (298.6 g., 1.4 mole). The stirrer is started and the aluminum chloride (373.4 g., 2.8 mole) is added over a period of 15 minutes. The temperature rises from 20° C. to 55° C.

The reaction mixture is refluxed for three hours using a steam bath as a heat source. There is a vigorous evolution of hydrochloric acid during this period and a viscous brown glass separates. Stirring becomes more difficult as the reaction progresses and may even have to be terminated. The reaction mixture is cooled to room temperature and the upper, heptane, phase decanted off. The residue is treated with a mixture of crushed ice (1 kg.) and concentrated hydrochloric acid (600 ml.). (A considerable amount of stirring and scraping is required to cause the aluminum complex to decompose.)

The mixture containing a yellow solid is thrice extracted with 500 ml. portions of ether. The combined ether extracts are washed with two 250 ml. portions of water and dried over anhydrous sodium sulfate. The ether is removed by distillation and the residue fractionated. The first fraction, B.P. 145° C./0.03 mm. (155° C./0.2 mm.), contains 2-butyryl-5-chloroanisole. The second fraction, B.P. 160–178° C./0.03 mm. (155–175° C./0.2 mm.), is quite pure 3-chloro-4-butyrylphenol. The yield is 138 g. of material which quickly solidifies upon cooling. Recrystallization of this material from cyclohexane (about two liters) gives a white crystalline product, M.P. 82.5–84° C. A second recrystallization gives little change in M.P. The gas-liquid chromatography on this material indicates that the product is 3-chloro-4-butyrylphenol and 2-butyryl-5-chlorophenol.

Analysis for $C_{10}H_{11}ClO_2$. Calculated: C, 60.46; H, 5.58; Cl, 17.85. Found: C, 60.15; H, 5.66; Cl, 17.77.

*Step D—3-chloro-4-[2-(dimethylaminomethyl)-butyryl]phenol hydrochloride.*— A 100 ml. round-bottomed flask fitted with a condenser and calcium chloride drying tube is charged with 3-chloro-4-butyrylphenol (36.6 g., 0.184 mole), dimethylamine hydrochloride (20 g., 0.245 mole), paraformaldehyde (7.2 g., 0.240 mole), concentrated hydrochloric acid (0.75 ml.) and absolute ethanol (30 ml.) and refluxed on a steam bath for 2½ hours and filtered. The mixture is cooled, diluted with water (200 ml.) and extracted with ether (33 ml. portions). The aqueous phase, which is subsequently used directly in Step E, begins to deposit crystals of 3-chloro-4-[2-(dimethylaminomethyl)butyryl]-phenol hydrochloride which melts at 89–92° C., after recrystallization from water.

Analysis for $C_{13}H_{18}NClO_2 \cdot HCl$. Calculated: C, 53.43; H, 6.55; N, 4.79. Found: C, 52.94; H, 6.48; N, 4.59.

*Step E—3-chloro-4-(2-methylenebutyryl)phenol.*— The aqueous fraction from Step D is treated with 60 ml. of saturated aqueous sodium bicarbonate solution and maintained at room temperature for 20 hours. The reaction mixture is acidified to Congo red paper with concentrated hydrochloric acid, extracted three times with a total of 100 ml. of ether and then made basic with excess aqueous sodium bicarbonate. After having been maintained at room temperature for 20 hours the aqueous solution is acidified to Congo red paper with concentrated hydrochloric acid and extracted three times with a total of 150 ml. of ether. The combined ether extracts are dried over sodium sulfate and the ether is evaporated in vacuo. The residual material is distilled, giving 21.7 g. of 3-chloro-4-(2-methylenebutyryl)phenol, B.P. 173° C. at 0.4 mm.

Analysis for $C_{11}H_{11}ClO_2$. Calculated: C, 62.71; H, 5.26. Found: C, 62.21; H, 5.20.

*Example 2.—2,3-dichloro-4-(2-methylenebutyryl)phenol*

*Step A—2,3-dichloroanisole.*—A five-liter, four-necked round-bottomed flask is equipped with a stirrer, thermometer, reflux condenser and two dropping funnels. 2,3-dichlorophenol (400 g., 2.45 mole) and 10 N sodium hydroxide (245 ml., 2.45 mole) are added. The temperature rises to 55° C. The mixture is heated to 80–85° C. on a steam bath and 10 N sodium hydroxide (613 ml., 6.15 mole) is placed in one dropping funnel and dimethyl sulfate (814 ml., 1083 g., 8.58 mole) in the other. The base and dimethyl sulfate are then added simultaneously in a dropwise manner over 3½ hours with stirring. Heating and stirring then is continued for one hour. The mixture then is cooled and water (2400 ml.) is added. The oil that separates soon solidifies. The solid is collected by filtration and dissolved in ether (1000 ml.) The filtrate is extracted with ether (600 ml.), the two ether solutions are combined and dried over anhydrous sodium sulfate. The ether is evaporated and the residue is dried in a vacuum desiccator over phosphorus pentoxide. The yield is 428 g. (98%) of 2,3-dichloroanisole, M.P. 32–33° C.

*Step B—2,3-dichloro-4-butyrylphenol.*—Butyryl chloride (128.0 g., 1.2 mole), 2,3-dichloroanisole (197.7 g., 1.11 mole), prepared as described in Step A, and carbon disulfide (400 ml.) are placed in a four-necked flask fitted with a mechanical stirrer, thermometer, reflux condenser (protected by a calcium chloride tube) and a Gooch sleeve bearing a 250 ml. Erlenmeyer flask containing anhydrous aluminum chloride (160 g., 1.2 mole). While the reaction mixture is cooled in an ice bath, the aluminum chloride is added in small portions with stirring at such a rate that the temperature of the reaction mixture does not exceed 20–25° C. The ice bath is removed and the mixture is stirred at room temperature for one hour, then in a water bath at 55° C. for 45 minutes and then kept at room temperature overnight.

n-Heptane (400 ml.) and aluminum chloride (160 g., 1.2 mole) then are added. The condenser is set for distillation, the mixture is stirred and heated in a water bath heated by means of a steam bath and the carbon disulfide is distilled off. A second portion of heptane (400 ml.) is added, the condenser is set for reflux, the reaction mixture is stirred and heated in a bath at 80° C. for three hours and then allowed to cool. The hexane is decanted and the residue hydrolyzed by the slow addition of a solution of concentrated hydrochloric acid (120 ml.) in water (1500 ml.). The brown solid that separates is collected by suction filtration, washed well with water and dissolved in ether. The ether solution is extracted twice with a total of two liters of 5% sodium hydroxide. The sodium hydroxide extract is stirred with decolorizing carbon (Norite) (2–3 teaspoons) and filtered by suction through a pad of diatomaceous earth (Super-Cel). Upon acidification, a light brown solid separates. This is collected by filtration, washed with water and dried at 100° C. for three hours.

The dried solid is dissolved in hot benzene (one l.) and the insoluble matter is removed by filtration. Upon cooling, a slightly colored solid separates. This is dissolved in hot benzene (750 ml.), the solution is allowed to cool to room temperature and then chilled to 10° C.

in a refrigerator. The product (203 g., 85%); M.P. 109–110.5° C., is collected by filtration. The product is taken up in 1500 ml. of hot benzene, treated with decolorizing carbon (Norite) and filtered. Upon cooling, a white solid identified as 2,3-dichloro-4-butyrylphenol (180 g., 75%); M.P. 109–110° C., separates.

Analysis for $C_{10}H_{10}Cl_2O_2$. Calculated: C, 51.52; H, 4.32; Cl, 30.42. Found: C, 51.70; H, 4.24; Cl, 30.32.

*Step C—2,3-dichloro-4-[2 - (dimethylaminomethyl)-butyryl]phenol hydrochloride.*—2,3-dichloro-4 - butyrylphenol (46.62 g., 0.2 mole), paraformaldehyde (12.01 g., 0.04 mole), dimethylamine hydrochloride (32.62 g., 0.4 mole), concentrated hydrochloric acid (one ml.) and absolute ethanol (46 ml.) are combined and heated under reflux, protected from moisture, for three hours.

After standing overnight at room temperature, the reaction solution is concentrated under reduced pressure to a viscous oil. The residual oil is triturated with water (150 ml.) and filtered to remove a white solid which is shown to be starting phenol (29% recovered). The aqueous filtrate is extracted with ether and then concentrated to dryness under reduced pressure to give 62.3 g. of 2,3-dichloro-4-[2 - (dimethylaminomethyl)-butyryl]phenol hydrochloride, a white solid, M.P. 130–150° C.

Two recrystallizations from absolute ethanol give 27.3 g. (42%) of 2,3-dichloro-4-[2-(dimethylaminomethyl)-butyryl]phenol hydrochloride melting at 156–159° C.

Analysis for $C_{13}H_{17}Cl_2NO_2(HCl)$. Calculated: C, 47.80; H, 5.55; N, 4.29. Found: C, 47.77; H, 5.55; N, 4.25.

*Step D—2,3-dichloro-4-(2-methylenebutyryl)phenol.*—2,3 - dichloro - 4 - [2-(dimethylaminomethyl)butyryl]-phenol hydrochloride (1.0 g., 0.00306 mole) is dissolved in water (25 ml.) and the solution made basic by the addition of saturated sodium bicarbonate solution. The colorless solution is heated on a steam bath (80–90° C.) for 30 minutes, cooled and made acid to Congo red test paper by the addition of 6 N hydrochloric acid. The resulting semi-solid is extracted with ether and the combined extracts are dried over anhydrous magnesium sulfate. The ether is evaporated under reduced pressure to give 0.65 g. (87%) of a white solid, M.P. 82–84° C.

Two recrystallizations from hexane give white prisms of 2,3-dichloro-4-(2-methylenebutyryl)phenol, melting at 84–85° C.

Analysis for $C_{11}H_{10}Cl_2O_2$. Calculated: C, 53.90; H, 4.11; Cl, 28.93. Found: C, 53.78; H, 3.96; Cl, 29.03.

*Example 3.—2,3-dichloro-4-(2-ethylidenebutyryl)phenol*

*Step A—2,3-dichloro-4-(2-ethylbutyryl)phenol.*—This product is prepared by substantially the same method as described in Example 2, Step B, using the reagents listed below:

2,3-dichloroanisole (see Ex. 2, Step A) _____ 53.11 g. (0.3 mole).
2-ethylbutyryl chloride _____ 80.77 g. (0.6 mole).
Carbon disulfide _____ 350.00 ml.
Aluminum chloride _____ 80.00 g. (0.6 mole).

Distillation of the residual oil gives 34.45 g. (44%) of product, B.P. 140–142° C./0.5 mm. After three recrystallizations from hexane, there is obtained white needles identified as 2,3-dichloro-4-(2-ethylbutyryl)phenol, M.P. 85–86° C.

Analysis for $C_{12}H_{14}Cl_2O_2$. Calculated: C, 55.19; H, 5.40; Cl, 27.15. Found: C, 55.21; H, 5.64; Cl, 26.98.

*Step B—2,3 - dichloro - 4 - (2 - bromo-2-ethylbutyryl) phenol.*—To a solution of 2,3-dichloro-4-(2-ethylbutyryl) phenol (522 mg., 0.002 mole) in glacial acetic acid (15 ml.) is added a solution of bromine (319 mg., 0.002 mole) in glacial acetic acid (5 ml.), dropwise, over a period of 15 minutes. (The reaction is initiated by adding a drop of 48% hydrobromic acid solution at the beginning of the addition period.) Stirring is continued for an additional 15 minutes at room temperature.

The colorless reaction solution is poured into water (80 ml.) containing sodium bisulfite (80 mg.). The resulting white solid is collected, washed with water and dried. The yield is 643 mg. (95%) of product, M.P. 120.5–122.5° C. Recrystallization from a mixture of hexane and benzene gives prisms of 2,3-dichloro-4-(2-bromo-2-ethyl-butyryl)phenol, M.P. 122.5–123.5° C.

Analysis for $C_{12}H_{13}BrCl_2O_2$. Calculated: C, 42.38; H, 3.85; Br, 23.50; Cl, 20.85. Found: C, 42.57; H, 3.92; Br, 23.38; Cl, 20.74.

*Step C—2,3-dichloro-4-(2-ethylidenebutyryl)phenol.*— A mixture of 2,3 - dichloro - 4-(2-bromo-2-ethylbutyryl)-phenol (430 mg., 0.00126 mole), lithium chloride (160 mg., 0.00378 mole) and dimethylformamide (3 ml.) is heated on a steam bath, with stirring, for 2¼ hours.

The cooled reaction solution is poured, with stirring, into water (45 ml.). The resulting white solid is collected, washed with water and dried. The yield is 308 mg. (94%), M.P. 117–119° C. Two recrystallizations from a mixture of hexane and benzene give prisms of 2,3-dichloro-4-(2-ethylidenebutyryl)phenol, M.P. 120–121° C.

Analysis for $C_{12}H_{12}Cl_2O_2$. Calculated: C, 55.62; H, 4.67; Cl, 27.36. Found: C, 55.50; H, 4.71; Cl, 27.35.

*Example 4.—2,3-dimethyl-4-(2-methylenebutyryl)phenol*

*Step A—2,3-dimethyl-4-butyrylphenol.* — To a well-stirred solution of butyryl chloride (60 g., 0.5 mole) and 2,3-dimethylanisole (68.09 g., 0.5 mole) in carbon disulfide (250 ml.), aluminum chloride (66.6 g., 0.5 mole) is added in portions during one hour. The reaction is very vigorous and hydrogen chloride is evolved. When the initial reaction is over the mixture is heated in a water bath at 55° C. for 1½ hours. Then a second portion of aluminum chloride (66.6 g.) is added, followed by 200 ml. of heptane and two ml. of dimethyl formamide. The condenser is set for downward distillation and the carbon disulfide is distilled. Heptane (100 ml.) is added and the mixture is heated at 90–100° C. for 3½ hours. After cooling the flask in an ice bath the heptane is decanted. The mixture in the flask is hydrolyzed by addition of ice (400 g.) followed by the addition of concentrated hydrochloric acid (100 ml.). The black, gummy material that forms is extracted with ether. The ether extract is washed with 6 N hydrochloric acid and water. The ether is evaporated and the residue is heated at 90–100° C. with 5% sodium hydroxide (500 ml.) for three hours to hydrolyze any phenolic etser present. The cooled mixture is extracted with ether and the basic aqueous solution obtained is filtered through a layer of Super-Cel and acidified with hydrochloric acid. The solid that separates is crystallized from benzene (125 ml.) to give 32 g. of 2,3-dimethyl-4-butyrylphenol which melts at 100–102° C.

Analysis for $C_{12}H_{16}O_2$. Calculated: C, 74.97; H, 8.39. Found: C, 74.59; H, 7.89.

*Step B—2,3-dimethyl-4-[2-(piperidinomethyl)butyryl] phenol hydrochloride.*—2,3 - dimethyl - 4 - butyrylphenol (15.6 g., 0.08 mole), piperidine hydrochloride (9.22 g., 0.08 mole), paraformaldehyde (2.4 g., 0.08 mole) and glacial acetic acid (1 ml.) are mixed and heated at 90–100° C. for 3½ hours. The mixture then is extracted with 500 ml. of boiling water and the aqueous mixture is cooled and extracted with ether and made basic by the addition of solid sodium bicarbonate. The oil that separates is taken up in ether. The solution is dried over sodium sulfate and acidified with alcoholic hydrogen chloride to obtain 18 g. of 2,3 - dimethyl - 4 - [2 - (piperidinomethyl) butyryl]phenol hydrochloride, M.P. 132–137° C. After drying over phosphorous pentoxide at one mm. pressure for a 24-hour period the 2,3-dimethyl-4-[2-(piperidinomethyl)butyryl]phenol hydrochloride has a melting point of 158–162° C.

Analysis for $C_{18}H_{28}ClNO_2$. Calculated: C, 66.33; H, 8.66; N, 4.30. Found: C, 66.00; H, 8.38; N, 4.27.

*Step C—1 - [2-(2,3-dimethyl-4-hydroxybenzoyl)butyl] 1 - methylpiperidinium iodide.*—2,3 - dimethyl - 4 - [2-(piperidinomethyl)butyryl]phenol hydrochloride (18.0 g., 0.055 mole) is suspended in water and the mixture is made basic by the addition of 10% sodium bicarbonate solution. The oil that separates is extracted with ether and the ether etxract is dried and evaporated. To the residual oil is added 150 ml. of absolute alcohol and 36 ml. of methyl iodide. After refluxing for 1½ hours the mixture is cooled and absolute ether is added until no more precipitate forms. The oil that separates soon solidifies. Recrystallization of the solid from absolute ethanol gives 1 - [2 - (2,3 - dimethyl - 4 - hydroxybenzoyl)butyl]-1-methylpiperidinium iodide, M.P. 195–196° C.

Analysis for $C_{19}H_{30}INO_2$. Calculated: C, 52.90; H, 7.00; N, 3.25. Found: C, 53.13; H, 6.98; N, 3.45.

*Step D—2,3-dimethyl-4-(2-methylenebutyryl)phenol.*— The 1-[2-(2,3-dimethyl-4-hydroxybenzoyl)butyl]-1-methylpiperidinium iodide obtained in Step C is dissolved in four liters of water and the solution made basic with sodium bicarbonate, heated at 80–90° C. for ½ hour, cooled and acidified with hydrochloric acid. The solid that separates is crystallized from a large volume of ligroin to obtain 4.46 g. of 2,3-dimethyl-4-(2-methylenebutyryl) phenol, M.P. 73–74° C.

Analysis for $C_{13}H_{16}O_2$. Calculated: C, 76.44; H, 7.90. Found: C, 76.61; H, 7.81.

*Example 5.—3-chloro-4-(2-methylenepropionyl)phenol*

*Step A—3-chloro-4-propionylphenol.*—By substituting an equimolar amount of propionyl chloride for the butyryl chloride employed in Example 1, Step B, and following substantially the procedure described in Steps B and C of Example 1, there is obtained 3-chloro-4-propionylphenol, M.P. 92–93° C.

Analysis for $C_9H_9ClO_2$. Calculated: C, 58.55; H, 4.91; Cl, 19.21. Found: C, 58.37; H, 5.26; Cl, 18.95.

*Step B—3 - chloro - 4 - [2-(dimethylaminomethyl)-propionyl]phenol.*—A solution of 3-chloro-4-propionylphenol (34.0 g., 0.184 mole) prepared as described in Step A, paraformaldehyde (7.2 g., 0.24 mole), dimethylamine hydrochloride (20.0 g., 0.245 mole) and 0.75 ml. of concentrated hydrochloric acid in absolute ethanol (30 ml.) are refluxed for two hours. On cooling, crude 3-chloro-4-[2-(dimethylaminomethyl)propionyl]phenol separates as a granular solid. The solid is slurried with absolute ethanol (50 ml.), collected by filtration and washed with ether to obtain 35.1 g. of 3-chloro-4-[2-(dimethylaminomethyl)-propionyl]phenol. After crystallization from absolute alcohol the product melts at 145–146° C.

Analysis for $C_{12}H_{17}Cl_2NO_2$. Calculated: C, 51.81; H, 6.16; N, 5.03. Found: C, 51.95; H, 6.21; N, 5.15.

*Step C—3-chloro-4-(2 - methylenepropionyl)phenol.*— 3-chloro-4-[2 - (dimethylaminomethyl)propionyl]phenol (20.25 g., 0.073 mole) is dissolved in a minimum amount of water (70 ml.) and 10% sodium bicarbonate (20 ml.) is added. After ½ hour, the mixture is acidified with hydrochloric acid and the yellow, pasty solid that separates is extracted with ether. The aqueous phase is again made basic by the addition of solid sodium bicarbonate, maintained at room temperature for 16 hours and acidified and extracted with ether. The combined ether extracts are dried over sodium sulfate and evaporated. The residue is crystallized from ether-ligroin to obtain 7.8 g. of 3-chloro-4-(2-methylenepropionyl)phenol, M.P. 75.5–76.5° C.

Analysis for $C_{10}H_9ClO_2$. Calculated: C, 61.08; H, 4.61; Cl, 18.03. Found: C, 60.75; H, 4.81; Cl, 17.91.

*Example 6.—2,4-dimethyl-5-(2-methylenebutyryl)phenol*

*Step A—2,4 - dimethyl-5-butyrylphenol.*—2,4-dimethyl-5-aminobutyrophenone (119.5 g., 0.63 mole) [C.A. 16: p. 414⁵] in a solution of 190 cc. of sulfuric acid and 945 cc. of water is diazotized at 5° C. with 46 g. (0.67 mole) of sodium nitrite. The resulting diazonium salt solution is then heated on a steam bath for 30 minutes. The phenol separates as an oil which crystallizes when the mixture is cooled and the said product is taken up in ether, extracted into a 5% sodium hydroxide solution and reprecipitated by acidification with dilute hydrochloric acid. Recrystallization from ethanol gives 76.5 g. of 2,4-dimethyl-5-butyrylphenol, M.P. 95–100° C. A small sample recrystallized from ethanol for analysis gives a melting point of 100.5–102° C.

Analysis for $C_{12}H_{16}O_2$. Calculated: C, 74.97; H, 8.39. Found: C, 74.41; H, 8.29.

*Step B—2,4-dimethyl-5-(2-methylenebutyryl)phenol.*— By substituting the 2,4-dimethyl-5-butyrylphenol of Step A for the 3-chloro-4-butyrylphenol of Example 1, Step D, and following substantially the procedure described therein, the compound 2,4-dimethyl-5-[2-(dimethylaminomethyl)butyryl]phenol hydrochloride is prepared; which amine is then treated according to the procedure described in Step E of Example 1 to produce the compound 2,4-dimethyl-5-(2-methylenebutyryl)phenol.

*Example 7.—3-(2-methylenepropionyl)-4-chlorophenol*

*Step A—2' - chloro-5'-nitropropiophenone.*—2'-chloropropiophenone (84.5 g., 0.5 mole) is added to 300 cc. of fuming nitric acid (d. 1.4) at a temperature of 5 to 10° C. during 18 minutes. The mixture is allowed to stand at 0–5° C. for 30 minutes and then poured into ice water. The solid product is recrystallized from isopropyl alcohol to obtain 75 g. of 2'-chloro-5'-nitropropiophenone, M.P. 52–56° C. After recrystallization from isopropyl alcohol the product melts at 54–56° C.

Analysis for $C_9H_8ClNO_3$. Calculated: C, 50.60; H, 3.77; N, 6.56. Found: C, 51.47; H, 4.01; N, 6.62.

*Step B—2'-chloro-5'-aminopropiophenone.*—A solution of 2'-chloro-5'-nitropropiophenone (25.9 g., 0.121 mole) in 60 cc. of acetic acid is added to 240 cc. of a 7.5 N hydrochloric acid solution in which is dissolved 100 g. of stannous chloride dihydrate. The solution is heated one hour on the steam bath and then made basic by the addition of a sodium hydroxide solution. The oily product is then taken up in ether and evaporated to obtain 18.0 g. of a yellow oil identified as 2'-chloro-5'-aminopropiophenone. This material is purified by collecting the fraction boiling at 143–146° C./0.5 mm.

Analysis for $C_9H_{10}ClNO$. Calculated: C, 58.86; H, 5.49; N, 7.63. Found: C, 59.10; H, 5.58; N, 7.54.

*Step C—3-propionyl-4-chlorophenol.*—2'-chloro-5'-aminopropiophenone (48.5 g., 0.26 mole) is dissolved in 192 cc. of water and 26 cc. of concentrated sulfuric acid and diazotized with a solution of 17.9 g. (0.26 mole) of sodium nitrite in 40 cc. of water. The diazonium mixture is then added dropwise during 30 minutes to a stirred mixture of 340 cc. of 1 N sulfuric acid containing 48.0 g. of cupric sulfate pentahydrate, and 250 cc. of toluene.

The toluene layer is then separated and extracted with a 5% solution of sodium hydroxide and acidified with hydrochloric acid to obtain an oily product which is purified by distillation. There is thus obtained 13.0 g. of 3-propionyl-4-chlorophenol, B.P. 135–140° C./0.5 mm.

*Step D—3-(2-methylenepropionyl)-4 - chlorophenol.*— By substituting the 3-propionyl-4-chlorophenol of Step C for the 3-chloro-4-butyrylphenol of Example 1, Step D, and following substantially the procedure described therein the compound 3-[2-(dimethylaminomethyl)-propionyl]-4-chlorophenol hydrochloride is prepared, which amine is then treated according to the procedure described in Step E of Example 1 to produce the compound 3-(2-methylenepropionyl)-4-chlorophenol.

*Example 8.—2-(2-methylenebutyryl)-3,5-dichlorophenol*

*Step A—2-butyryl-3,5-dichlorophenol.*—To a solution of 3,5-dichlorophenol (24.4 g., 0.15 mole) in 60 cc. of pyridine is added, over a 15-minute period while cooling on an ice bath, 19.3 g. (0.18 mole) of butyryl chloride. The mixture is permitted to stand one hour at room temperature and then diluted with 300 cc. of water. The oily product is then taken up in ether and the ether solution washed thoroughly with dilute hydrochloric acid and water, dried and the ether evaporated to leave 33.2 g. of the butyric acid ester of 3,5-dichlorophenol in the form of a liquid.

The butyric acid ester of 3,5-dichlorophenol is mixed with 38.5 g. (0.29 mole) of aluminum chloride and the mixture heated 1.6 hours on the steam bath. The reaction mixture is then poured onto ice and the solid product obtained is recrystallized from ligroin to obtain 21.5 g. of 2-butyryl-3,5-dichlorophenol, M.P. 45–48° C. A small sample recrystallized further from ligroin gives a constant M.P. of 47–48.5° C.

Analysis for $C_{10}H_{10}Cl_2O_2$. Calculated: C, 51.52; H, 4.32. Found: C, 52.37; H, 4.35.

*Step B—2-(2-methylenebutyryl)-3,5-dichlorophenol.*— By substituting the 2-butyryl-3,5-dichlorophenol of Step A for the 3-chloro-4-butyrylphenol of Example 1, Step D, and following substantially the procedure described therein the compound 2-(2-dimethylaminomethyl)butyryl-3,5-dichlorophenol hydrochloride is prepared; which amine is then treated according to the procedure described in Step E of Example 1 to produce the compound 2-(2-methylenebutyryl)-3,5-dichlorophenol.

*Example 9.—2,4-dichloro-3-(2-methylenebutyryl)phenol*

*Step A—2,6 - dichloro-3-methoxy- -propylbenzyl alcohol.*—2,6-dichloro-3-methoxybenzaldehyde (109 g., 0.53 mole) is added to a solution of propylmagnesium bromide [prepared by the reaction of 72.4 g. (0.59 mole) of propyl bromide with 14.4 g. (0.59 mole) of magnesium] in 600 cc. of ether over a period of ½ hour. The mixture is refluxed for 1½ hours and poured into ice-cold dilute hydrochloric acid. The ether layer is then separated, washed with water, dried over sodium sulfate and evaporated to give 126 g. of a yellow oil identified as 2,6-dichloro-3-methoxy-α-propylbenzyl alcohol.

*Step B—2′,6′ - dichloro-3′-methoxybutyrophenone.*—A solution of 2,6-dichloro-3-methoxy-α-propylbenzyl alcohol (126 g., 0.51 mole) and sodium dichromate dihydrate (98.5 g., 0.33 mole) in 150 cc. of water and 400 cc. of acetic acid is heated one hour on the steam bath. The solution is diluted with 2.5 l. of water to produce an oily product which is then taken up in ether, the ether solution washed with water and sodium bicarbonate solution and then dried over sodium sulfate. Evaporation of the ether gives 119 g. of 2′,6′-dichloro-3′-methoxybutyrophenone in the form of a yellow oil.

*Step C—2,4-dichloro-3-butyrylphenol.*—A mixture of 2′6′-dichloro-3′ - methoxybutyrophenone (119 g., 0.48 mole) and aluminum chloride (191 g., 1.44 mole) in 600 cc. of heptane is stirred and heated for 2½ hours on the steam bath. The heptane is decanted from the viscous precipitate and the precipitate hydrolyzed by the addition of ice in dilute hydrochloric acid. The oily product obtained is then taken up in ether and purified by distillation to give 76.5 g. of 2,4-dichloro-3-butyrylphenol, B.P. 148–150° C./1.5 mm., $n_D^{26}$ 1.5558.

Analysis for $C_{10}H_{10}Cl_2O_2$. Calculated: C, 51.52; H, 4.32. Found: C, 51.67; H, 4.57.

*Step D—2,4-dichloro-3-(2-methylenebutyryl)phenol.*— By substituting the 2,4-dichloro-3-butyrylphenol of Step C for the 3-chloro-4-butyrylphenol of Example 1, Step D, and following substantially the procedure described therein, the compound 2,4-dichloro-3-[2-(dimethylaminomethyl)butyryl]phenol hydrochloride is prepared; which amine is then treated according to the procedure described in Step E of Example 1 to produce the compound 2,4-dichloro-3-(2-methylenebutyryl)phenol.

By substituting the appropriate 4-alkanoylphenol for the 2,3-dichloro-4-butyrylphenol reactant of Example 2, Step C, and following substantially the procedure described in Steps C and D, the corresponding 4 - (2 - methylenealkanoyl)phenol compounds are prepared. The following equation, wherein the radical X represents an integer having a value of one or a number greater than one, depicts the said process. Table I illustrates the 4-alkanoylphenol reactants of the process and the methylene substituted products obtained thereby:

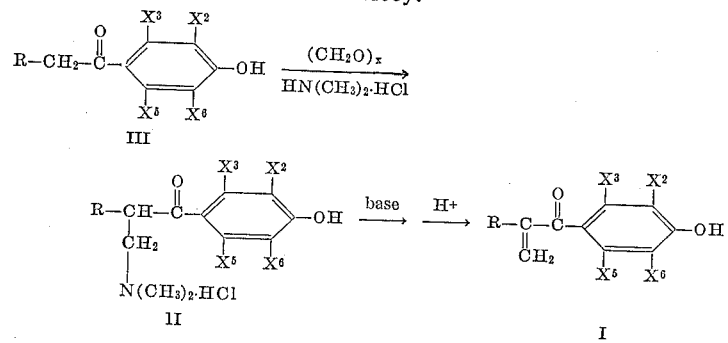

TABLE I

| Ex. | R | X² | X³ | X⁵ | X⁶ |
|---|---|---|---|---|---|
| 10 | -CH(CH₂-CH₂)(CH₂-CH₂) | H | Cl | H | H |
| 11 | -C₂H₅ | -CH₂-CH₂-CH₂-CH₂- | | H | H |
| 12 | -CH₂-C₆H₅ | H | Cl | H | H |
| 13 | -C₆H₅ | H | Cl | H | H |
| 14 | -CH(CH₂-CH₂)(CH₂-CH₂)CH₂ | H | Cl | H | H |

TABLE I—Continued

| Ex. | R | X² | X³ | X⁵ | X⁶ |
|---|---|---|---|---|---|
| 15 | —C₂H₅ | —CH=CH— | —CH=CH— | H | H |
| 16 | —C₂H₅ | —CH₃ | Cl | H | H |
| 17 | —C₂H₅ | Cl | —CH₃ | H | H |
| 18 | —CH—CH₃<br>\|<br>CH₃ | H | Cl | H | H |
| 19 | —CH—CH₃<br>\|<br>CH₃ | Cl | Cl | H | H |
| 20 | —CH₂—CF₃ | —CH₃ | —CH₃ | H | H |
| 21 | —CH—CH₃<br>\|<br>CF₃ | H | —CH₃ | H | H |
| 22 | —C₂H₅ | —CH₃ | —CH₃ | —CH₃ | H |
| 23 | —C₂H₅ | —CH₃ | —CH₃ | —CH₃ | —CH₃ |

In addition to their utility as diuretic and saluretic agents the 4-acryloylphenols of this invention are also highly useful as chemical intermediates in the preparation of [4-(2-alkylidenealkanoyl)phenoxy]-acetic acids, as described in my copending application Ser. No. 304,959, filed Aug. 27, 1963. As described in my said copending application, the 4-acryloylphenols described herein react with diazoacetic acid ester, 2-haloacetic acid or the ester derivative of 2-haloacetic acid to produce the corresponding [4-(2-alkylidenealkanoyl)phenoxy]acetic acid products. Pharmacological studies of the [4-(2-alkylidenealkanoyl)phenoxy]acetic acids thus produced show that they also possess highly active diuretic, natriuretic and chloruretic properties and are therefore useful in the treatment of many ailments resulting from an excessive retention of electrolytes and fluid retention.

What is claimed is:

1. A compound of the formula:

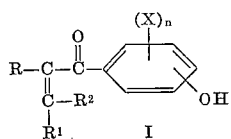

wherein R is a member selected from the group consisting of lower alkyl, trifluoromethyl-lower alkyl, cycloalkyl, containing 3–6 nuclear carbon atoms,

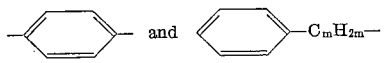

wherein $m$ is an integer having a value of 1–5, $R^1$ and $R^2$ each represents a member selected from the group consisting of hydrogen and lower alkyl, X represents similar or dissimilar radicals selected from the group consisting of halogen, lower alkyl and, when substituted on adjacent carbon atoms of the benzene nucleus, two X radicals are combined to form a hydrocarbylene chain selected from the group consisting of 1,3-butadienylene and tetramethylene and $n$ is an integer having a value of 1–4.

2. A compound of the formula:

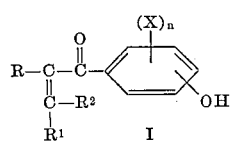

wherein R is a member selected from the group consisting of lower alkyl, trifluoromethyl-lower alkyl and cycloalkyl containing 3–6 nuclear carbon atoms, $R^1$ and $R^2$ each represents a member selected from the group consisting of hydrogen and lower alkyl, X represents similar or dissimilar radicals selected from the group consisting of halogen and lower alkyl and $n$ is an integer having a value of 1–4.

3. A compound of the formula:

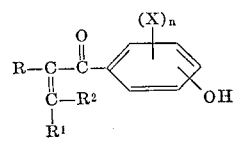

wherein the radical R is a member selected from the group consisting of lower alkyl and trifluoromethyl-lower alkyl, $R^1$ and $R^2$ each represents a member selected from the group consisting of hydrogen and lower alkyl, X represents similar or dissimilar radicals selected from the group consisting of halogen and lower alkyl and $n$ is an integer having a value of 1–4.

4. A compound of the formula:

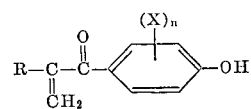

wherein R represents lower alkyl, X represents halogen and $n$ is an integer having a value of 1–4.

5. A compound of the formula:

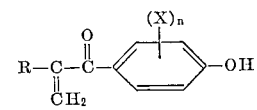

wherein R represents lower alkyl, X represents lower alkyl and $n$ is an integer having a value of 1–4.

6. A compound of the formula:

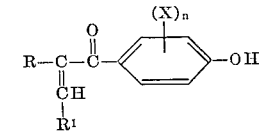

wherein R and $R^1$ each represents lower alkyl, X represents halogen and $n$ is an integer having a value of 1–4.

7. A compound of the formula:

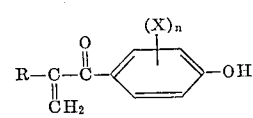

wherein R represents trifluoromethyl-lower alkyl, X represents halogen and $n$ is an integer having a value of 1–4.

8. A compound of the formula:

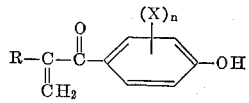

wherein R represents trifluoromethyl-lower alkyl, X represents lower alkyl and n represents an integer having a value of 1–4.

9. 3-chloro-4-(2-methylenebutyryl)phenol.
10. 2,3-dichloro-4-(2-methylenebutyryl)phenol.
11. 2,3-dichloro-4-(2-ethylidenebutyryl)phenol.
12. 2,3-dimethyl-4-(2-methylenebutyryl)phenol.
13. 3-chloro-4-(2-methylenepropionyl)phenol.
14. 2,4-dimethyl-5-(2-methylenebutyryl)phenol.
15. 3-(2-methylenepropionyl)-4-chlorophenol.
16. 2-(2-methylenebutyryl)-3,5-dichlorophenol.
17. 2,4-dichloro-3-(2-methylenebutyryl)phenol.

References Cited

UNITED STATES PATENTS

| 2,644,012 | 6/1953 | Korman et al. | 260—592 |
| 2,778,853 | 1/1957 | Schultz | 260—590 |

FOREIGN PATENTS

| 515,110 | 1/1931 | Germany. |

DANIEL D. HORWITZ, *Primary Examiner.*